(12) United States Patent
Panusopone et al.

(10) Patent No.: US 9,020,043 B2
(45) Date of Patent: Apr. 28, 2015

(54) PATHWAY INDEXING IN FLEXIBLE PARTITIONING

(75) Inventors: Krit Panusopone, San Diego, CA (US); Limin Wang, San Diego, CA (US)

(73) Assignee: Google Inc., Mountain View, CA (US)

( * ) Notice: Subject to any disclaimer, the term of this patent is extended or adjusted under 35 U.S.C. 154(b) by 911 days.

(21) Appl. No.: 13/101,809

(22) Filed: May 5, 2011

(65) Prior Publication Data

US 2011/0274176 A1    Nov. 10, 2011

Related U.S. Application Data

(60) Provisional application No. 61/332,941, filed on May 10, 2010.

(51) Int. Cl.
*H04N 7/26* (2006.01)
*H04N 19/61* (2014.01)
*H04N 19/50* (2014.01)
*G06T 9/20* (2006.01)

(52) U.S. Cl.
CPC ........ *H04N 19/61* (2013.01); *G06T 9/20* (2013.01); *H04N 19/50* (2013.01)

(58) Field of Classification Search
CPC ............................................................. G06T 9/20
See application file for complete search history.

(56) References Cited

U.S. PATENT DOCUMENTS

| | | | |
|---|---|---|---|
| 4,463,372 A | 7/1984 | Bennett et al. | |
| 5,295,201 A | 3/1994 | Yokohama | |
| 6,035,059 A | 3/2000 | Kurosawa et al. | |
| 6,271,890 B1 | 8/2001 | Tamir et al. | |
| 2001/0041015 A1 | 11/2001 | Chui | |
| 2003/0039307 A1 | 2/2003 | Prakash et al. | |
| 2007/0025444 A1 | 2/2007 | Okada et al. | |
| 2008/0063069 A1 | 3/2008 | Sekiguchi et al. | |
| 2008/0159408 A1 | 7/2008 | Degtyarenko | |
| 2008/0199091 A1 | 8/2008 | Srinivasan et al. | |
| 2009/0097543 A1 | 4/2009 | Pan et al. | |

(Continued)

FOREIGN PATENT DOCUMENTS

WO    2008/016605 A2    2/2008

OTHER PUBLICATIONS

Kondo et al., "A Motion Compensation Technique Using Sliced Blocks in Hybrid Video Coding," Proceedings of the 2005 International Conference on Image Processing, vol. 2, Sep. 11, 2005, ISBN: 978-0-7803-9134-5.*

(Continued)

*Primary Examiner* — Andy Rao
*Assistant Examiner* — Tyler Edwards
(74) *Attorney, Agent, or Firm* — Young Basile Hanlon & MacFarlane P.C.

(57) ABSTRACT

There is a processing of an incoming video signal into a compressed video bitstream. The processing includes determining indexed pathways of blocks in the incoming video signal. The processing also includes determining flexible partitioning of the blocks utilizing partitioning lines. The partitioning lines are based on index units in the determined indexed pathways. The processing also includes generating PIFP information associated with the determined flexible partitioning and encoding the generated PIFP information associated with the PIFP encoded video. Also, there is a processing of received PIFP encoded video utilizing received encoded PIFP information associated with the received PIFP encoded video.

14 Claims, 11 Drawing Sheets

(56) References Cited

U.S. PATENT DOCUMENTS

| | | |
|---|---|---|
| 2009/0278961 A1 | 11/2009 | Mohanty et al. |
| 2009/0304255 A1 | 12/2009 | Hagiwara et al. |
| 2009/0322937 A1 | 12/2009 | Young et al. |
| 2009/0324121 A1 | 12/2009 | Bhagavathy et al. |
| 2010/0061461 A1 | 3/2010 | Bankoski et al. |
| 2010/0208827 A1* | 8/2010 | Divorra Escoda et al. ............. 375/240.24 |
| 2012/0027083 A1 | 2/2012 | Narroschke et al. |

OTHER PUBLICATIONS

PCT Search Report & Written Opinion, Re: Application #PCT/US2011/035720; Aug. 19, 2011.

Kondo S, et al, "A Motion Compensation Technique Using Sliced Blocks in Hybrid Video Coding", Proceedings of the 2005 International Conference on Image Processing, vol. 2, Sep. 11, 2005 ; pp. 305-308.

Bronshtein I N, et al, "Handbook of Mathematics—Passage", 2004; pp. 194-195.

Zheng, Xiaozhen and Haoping Yu, "Flexible macroblock partition for inter-frame coding", Joint Collaborative Team on Video Coding (JCT-VC) of ITU-T SG16 WP3 and ISO/IEC JTC1/SC29/WG11, 1st Meeting: Dresden, DE, Apr. 5-23, 2010.

Yang, Haitao, Jiali Fu, Sixin Lin, Jin Song, Dong Wang, Mingyuan Yang, Jiantong Zhou, Haoping Yu, "Description of video coding technology proposal by Huawei Technologies & Hisilicon Technologies", Joint Collaborative Team on Video Coding (JCT-VC) of ITU-T SG16 WP3 and ISO/IEC JTC1/SC29/WG11, 1st Meeting: Dresden, DE, Apr. 15-23, 2010.

Karczewicz, Marta, Peisong Chen, Rajan Joshi, Xianglin Wang, and Wei-Jung Chien, "Video coding technology proposal by Qualcomm Inc.", Joint Collaborative Team on Video Coding (JCT-VC) of ITU-T SG16 WP3 and ISO/IEC JTC1/SC29/WG11, 1st Meeting: Dresden, DE, Apr. 15-23, 2010.

Guo, Liwei, Peng Yin, and Edouard Francois, "TE 3: Simplified Geometry Block Partitioning", Joint Collaborative Team on Video Coding (JCT-VC) of ITU-T SG16 WP3 and ISO/IEC JTC1/SC29/WG11, 2nd Meeting: Geneva, CH, Jul. 21-28, 2010.

* cited by examiner

PATHWAY INDEXING IN FLEXIBLE PARTITIONING

CLAIM FOR PRIORITY

The present application claims the benefit of priority to U.S. Provisional Patent Application Ser. No. 61/332,941, filed on May 10, 2010, entitled "Representing Flexible Block Partitioning Using Boundary Index", by Krit Panusopone, et al., the disclosure of which is hereby incorporated by reference in its entirety.

BACKGROUND

ITU-T H.264/MPEG-4 Part 10, is an international standard for video compression. It was adopted in 2003 and developed through a joint team partnership including the ITU-T Video Coding Experts Group (VCEG) together with the ISO/IEC Moving Picture Experts Group (MPEG). This standard is also referred to as MPEG-4 AVC (Advanced Video Coding).

Bitrate refers to the amount or number of bits conveyed per unit of time within the bandwidth of a communications network. With the use of MPEG-4 AVC, there is commonly a substantial bitrate savings over the older MPEG-2 standard. At the same time, this is with no substantial loss or even an improvement in the image quality of the encoded video. It is reported that for digital satellite television, MPEG-4 AVC uses less than half the overhead of MPEG-2 while giving the same or better quality as comparable MPEG-2 implementations. A still lower bitrate than MPEG-4 AVC is more desirable to increase further the availability of bandwidth, either for additional encoded video or for other utilizations.

High Efficiency Video Coding (HEVC) has been proposed as a newer video compression standard as a successor to MPEG-4 AVC. HEVC, like MPEG-4 AVC, has also been developed through a joint team partnership of ITU-T VCEG and ISO MPEG. One aim in HEVC is to substantially improve coding efficiency compared to the "High Profile" of MPEG-4 AVC. This profile is associated with high definition television. A goal of HEVC is to reduce by half the bitrate requirement of the MPEG-4 AVC High Profile, while also maintaining comparable image quality.

Among the proposals made for HEVC are those for "Geometric Block Partitioning" (GEO) and "Flexible Block Partitioning" (FLEX). FLEX is a methodology for flexibly partitioning blocks used in inter-frame coding. GEO is a different methodology used for flexibly partitioning blocks, and is geometrically-adaptive.

Both GEO and FLEX include the partitioning, or dividing, of a block into two non-overlapped parts called partitions. The partitions, according to each method, have a range to the variety of shapes for the two partitions. The range in the variety of partition shapes in GEO and FLEX differs. Both methodologies bring flexibility to the placement of the partitioning line in a block. This flexibility improves coding efficiency since the two partitions may be associated with two or more separate objects in the same block. The flexible partitioning in both GEO and FLEX includes computational steps in the encoding process. The computations for determining a partitioning line in GEO are more complex than FLEX. The description of the partitioning of the block requires an overhead of bits which is then encoded. In order to help limit the computational complexity in the flexible partitioning, and the amount of overhead used, both GEO and FLEX use a straight line in partitioning a block. However, each uses different parameters to describe the partitioning line.

In FLEX, the partitioning line is directional in nature. But the direction of the partitioning line is limited to only four choices. This is described in greater detail below in FIG. 4, demonstrating a comparative example including FLEX. The four choices for the direction of the partitioning line in FLEX are a 45 degree positive slope direction (see "FLEX I" 400), a 135 degree negative slope direction (see "FLEX II" 402), strict vertical direction (see "FLEX III" 404), and a strict horizontal direction (see "FLEX IV" 406). Also, a parameter "pos" is utilized in FLEX to describe the relative offset of the partitioning line in any block, from the block's center. Compared with GEO, FLEX involves much lower computational complexity in determining the partitioning line. Therefore, FLEX uses less overhead than GEO to encode the parameters used to describe its partitioning line. But FLEX has its drawbacks in that it offers only a limited number of possible partition shapes due to FLEX having only four possible directions for the partitioning line.

GEO describes the partitioning line by using two computational parameters. The parameters include an orientation angle "theta" (i.e., $\theta$) for the direction of the partitioning line and a relative location "rho", (i.e., $\rho$) describing an offset of the partitioning line from a block's center. These are described in greater detail below in FIG. 5, demonstrating a comparative example including GEO. Both GEO parameters are needed in determining the slope and the real pixel coordinates associated with the partitioning line in GEO. Also, in encoding GEO partitioned blocks, quantization is applied to the two parameters. The applied quantization in encoding the two parameters may be varied to balance a trade-off in GEO between coding efficiency and bitrate overhead. However, GEO has its own drawbacks when compared with FLEX, despite the greater range GEO has for partition shape variability. In GEO, the two parameters used to describe the partitioning line involve significantly more complex computations in the encoding process. Also, more bitrate overhead is required for encoding the parameters used in GEO. GEO requires significantly more bitrate overhead than FLEX.

Accordingly, the choice between GEO and FLEX for the HEVC standard is limited in terms of partitioning flexibility, bitrate overhead from encoding computational complexity and the parameters used in GEO. Some alternative implementation of flexible partitioning which addresses drawbacks and shortcomings associated with FLEX and GEO would be useful.

SUMMARY OF THE INVENTION

According to a first embodiment, there is a pathway indexing in flexible partitioning (PIFP) encoding system to process an incoming video signal into a compressed video bitstream. The system includes a processor to determine indexed pathways of blocks in the incoming video signal. The processor is also to determine flexible partitioning of the blocks utilizing partitioning lines based on index units in the determined indexed pathways. The processor is also generate PIFP information associated with the determined flexible partitioning and encode the generated PIFP information associated with PIFP encoded video in the compressed video bitstream.

According to a second embodiment, there is a pathway indexing in flexible partitioning (PIFP) encoding method of processing an incoming video signal into a compressed video bitstream. The method includes determining indexed pathways of blocks in the incoming video signal. The method also includes determining flexible partitioning of the blocks utilizing partitioning lines based on index units in the determined indexed pathways. The method also includes generating PIFP information associated with the determined flexible partitioning and encoding the generated PIFP information associated with the PIFP encoded video in the compressed video bitstream.

According to a third embodiment, there is a non-transitory computer readable medium storing computer readable instructions that when executed by a computer system perform a pathway indexing in flexible partitioning (PIFP) encoding method of processing an incoming video signal into a compressed video bitstream. The method includes determining indexed pathways of blocks in the incoming video signal. The method also includes determining flexible partitioning of the blocks utilizing partitioning lines based on index units in the determined indexed pathways. The method also includes generating PIFP information associated with the determined flexible partitioning and encoding the generated PIFP information associated with the PIFP encoded video in the compressed video bitstream.

According to a fourth embodiment, there is a pathway indexing in flexible partitioning (PIFP) decoding system to decode PIFP encoded video from an incoming compressed video bitstream. The system includes a processor to receive the incoming compressed video bitstream including the PIFP encoded video and receive PIFP information associated with the received PIFP encoded video. The processor is also to decode the received PIFP encoded video utilizing the received PIFP information to determine flexible partitioning in the PIFP encoded video to form an outgoing video signal.

According to a fifth embodiment, there is a pathway indexing in flexible partitioning (PIFP) decoding method to decode PIFP encoded video from an incoming compressed video bitstream. The method includes receiving the incoming compressed video bitstream including the PIFP encoded video and receiving PIFP information associated with the received PIFP encoded video. The method also includes decoding the received PIFP encoded video utilizing the received PIFP information to determine flexible partitioning in the PIFP encoded video to form an outgoing video signal.

According to a sixth embodiment, there is a non-transitory computer readable medium storing computer readable instructions that when executed by a computer system perform a pathway indexing in flexible partitioning (PIFP) decoding method to decode PIFP encoded video from an incoming compressed video bitstream. The method includes receiving the incoming compressed video bitstream including the PIFP encoded video and receiving PIFP information associated with the received PIFP encoded video. The method also includes decoding the received PIFP encoded video utilizing the received PIFP information to determine flexible partitioning in the PIFP encoded video to form an outgoing video signal.

The PIFP embodiments provide high flexibility in partition shape in flexible partitioning, without the limitations on partitioning line straightness and direction required by FLEX, and without the tradeoff in bitrate overhead required by GEO. The PIFP items may also be used in predictive coding to describe the flexible partitioning of neighboring blocks. One advantage is adding predictive coding features derived from coded neighboring blocks. Another advantage includes a reduction in bitrate overhead based on the relationships between neighboring blocks. The PIFP embodiments provide these advantages in addition to addressing drawbacks and shortcomings associated with FLEX and GEO.

BRIEF DESCRIPTION OF THE DRAWINGS

Features of the present disclosure will become apparent to those skilled in the art from the following description with reference to the figures, in which.

DETAILED DESCRIPTION

According to the examples, there are Pathway Indexing in Flexible Partitioning (PIFP) encoding and decoding apparatuses, methods, and machine readable instructions stored on computer-readable media to encode and decode video with associated PIFP information. These PIFP items provide high flexibility in partition shape in flexible partitioning, without the limitations on partitioning line straightness and direction required by FLEX, and without the tradeoff in bitrate overhead required by GEO. The PIFP items may also be used in predictive coding to describe the flexible partitioning of neighboring blocks. One advantage is adding predictive coding features derived from coded neighboring blocks. Another advantage includes a reduction in bitrate overhead based on the relationships between neighboring blocks. The PIFP items provide these advantages in addition to addressing drawbacks and shortcomings associated with FLEX and GEO.

For simplicity and illustrative purposes, the present disclosure is described by referring mainly to examples thereof. In the following description, numerous specific details are set forth in order to provide a thorough understanding of the present disclosure. It is readily apparent however, that the present disclosure may be practiced without limitation to these specific details. In other instances, some methods and structures have not been described in detail so as not to unnecessarily obscure the present disclosure. Furthermore, different examples are described below. The examples may be used or performed together in different combinations. As used herein, the term "includes" means includes but is not limited to the term "including". The term "based on" means based at least in part on.

Figure 1:
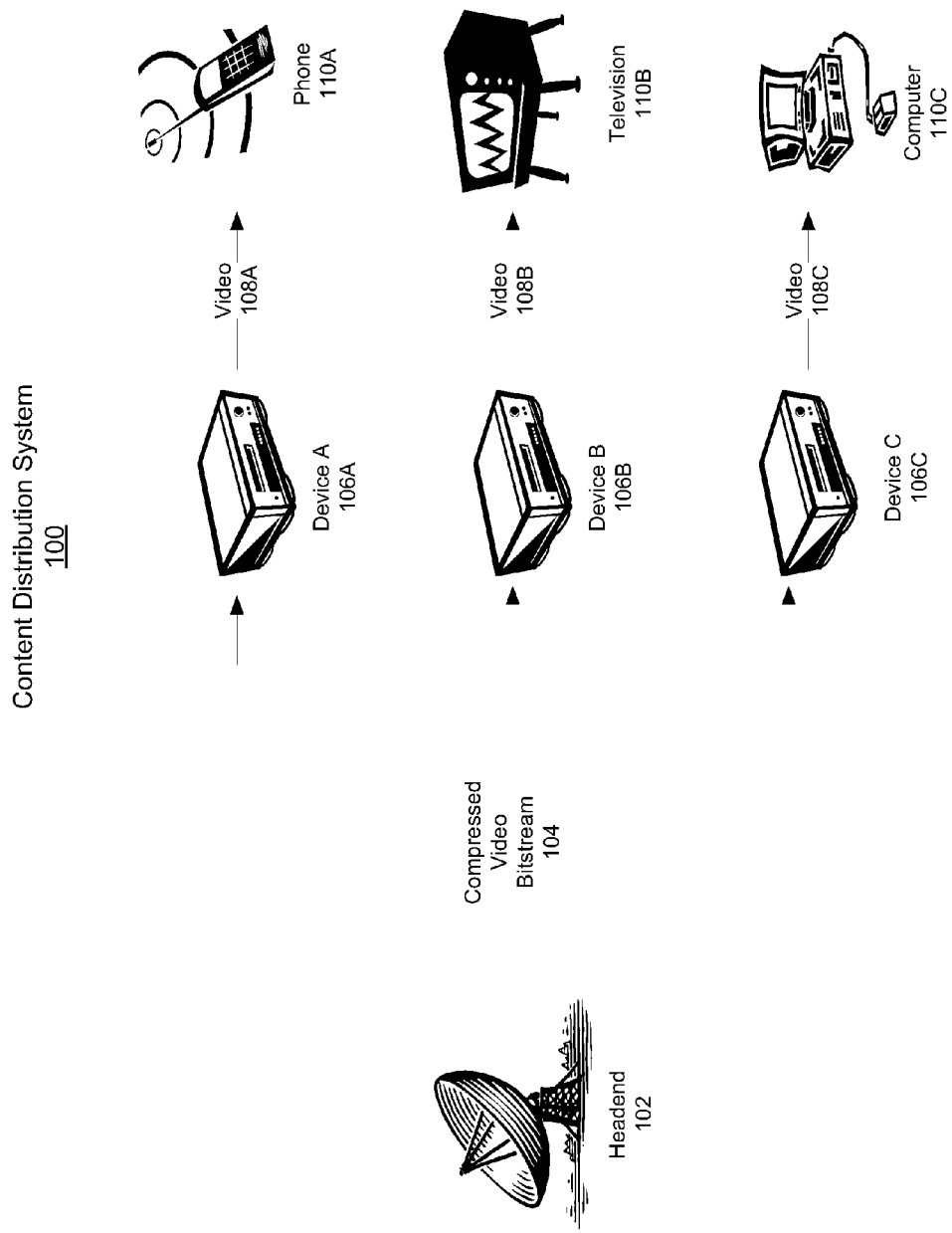
FIG. 1 is a system context diagram illustrating a content distribution system distributing content through a compressed video bitstream, according to an example of the present disclosure.

Referring to FIG. 1, there is shown a content distribution system 100 including a headend 102. At headend 102, video may be encoded utilizing PIFP encoding to form PIFP encoded video. PIFP encoding also generates PIFP information associated with the PIFP encoded video. The PIFP information may be packetized with the PIFP encoded video in a compressed video bitstream. The PIFP encoded video and the PIFP information may be transmitted separately or together in a compressed video bitstream 104. The headend 102 transmits the compressed video bitstream 104 to receiving devices such as device A 106A, device B 106B and device C 106C. The receiving devices may be, for example, a set-top box or an integrated receiving device. The receiving devices may utilize PIFP decoding to decode the PIFP encoded video utilizing the PIFP information associated with the PIFP encoded video. The decoded video 108A, 108B, and 108C may then be transmitted from, respectively, device A 106A, device B 106B and device C 106C, for use, respectively, in the client devices including phone 110A, television 110B and computer 110C. PIFP methodology, including PIFP encoding, PIFP information and PIFP decoding is explained in greater detail below.

Figure 3:
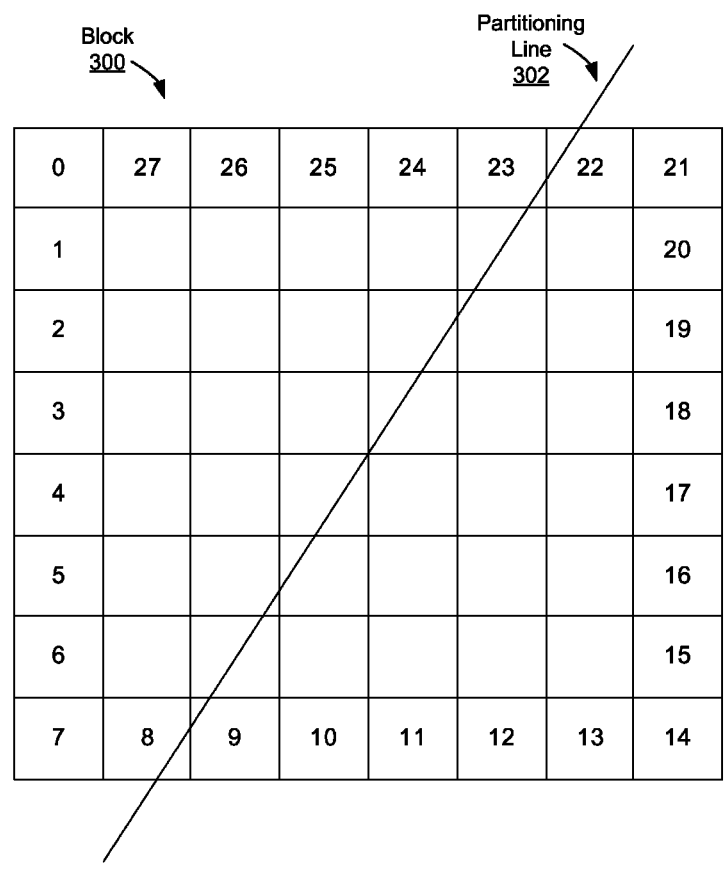
FIG. 3 is a schematic diagram illustrating PIFP partitioning of a block including a PIFP partitioning line, according to an example of the present disclosure.

The PIFP methodology provides a way by which to describe a partitioning line to divide a block into different shaped partitions in a flexible partitioning process. Two points may be used in PIFP to describe aspects of a straight or a curved line. According to an example, a PIFP partitioning line may be a straight line which may traverse two points. A PIFP partitioning may also be a curved line which may traverse two points. If a PIFP partitioning line is a straight line, two points which describe the direction of the PIFP partitioning line may be two points along a PIFP indexed pathway. In one example, as described in greater detail below with respect to FIG. 3, a PIFP indexed pathway may be the sequentially numbered index units in the indexed pathway which follow the peripheral boundary of the block 300, a square block having four sides. In FIG. 3, there are 28 index units along the PIFP indexed pathway numbered from "0" to "27". If any two points along this PIFP indexed pathway are from two different sides of the square block, then the two points in the PIFP indexed pathway may be used to describe the direction of a PIFP partitioning line, such as PIFP partitioning line 302 which divides the square block while traversing the index units having index unit identities "8" and "22".

A PIFP partitioning line may be described by any two index units which are each associated with one of two points along a PIFP indexed pathway which may be in or located in proximity with a block. A pathway of an index may include index units with sequentially numbered index unit identities which are associated with sequential location points along an indexed pathway. According to another example, a PIFP partitioning line may be described by two points along the PIFP partitioning line which traverses two or more points along a PIFP indexed pathway describing a geometrical shape. One such geometrical shape of a PIFP indexed pathway may be a circle centered within the block. In this example, the circle is the PIFP indexed pathway and the PIFP partitioning line may be described by any two points associated with index units in the circular indexed pathway. In another example, a PIFP indexed pathway may be described by a function which is associated with the block, such as by a function forming a curved PIFP indexed pathway. In this example, the PIFP indexed pathway may include a curve or an angle. Index units along the curved or angular PIFP indexed pathway may provide two points along a PIFP partitioning line which traverses a block to partition it. In all these examples, the PIFP partitioning line, including a direction and locations in passing through the block, may be described by two points which are associated with two separate PIFP index units in a PIFP indexed pathway.

In the PIFP methodology, the variability in the shape of the partitions formed by a PIFP partitioning line is not limited as it is in FLEX. And relative to GEO, PIFP encoding has relatively little computation involved as, among other things, only the two points may be utilized to describe the PIFP partitioning line. In this example, no variable parameter is utilized to compute a description of the PIFP partitioning line. Because there is relatively little computation in PIFP encoding, this reduces computing used in the PIFP encoding and the overhead used in compressed video bitstream with PIFP encoded video.

Figure 2:
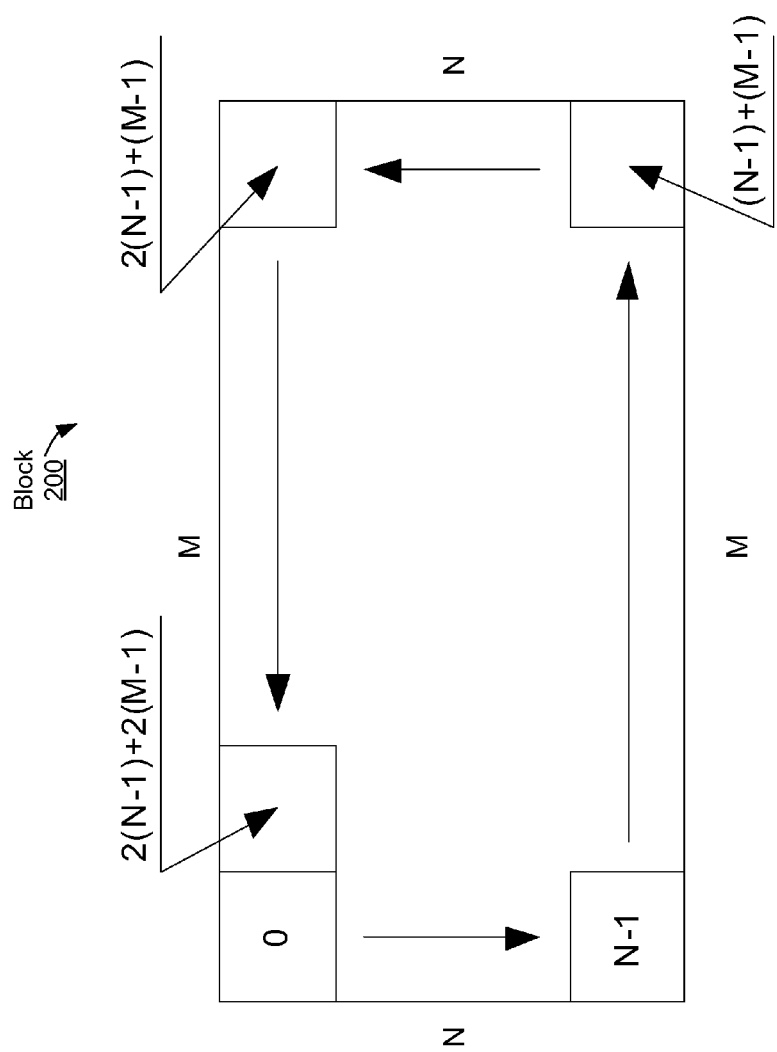
FIG. 2 is a schematic diagram illustrating Pathway Indexing in Flexible Partitioning (PIFP) partitioning of a block, according to an example of the present disclosure.

In PIFP encoding, an index unit may be assigned to each pixel or some other type of location along the PIFP indexed pathway. The PIFP indexed pathway may be along a peripheral boundary of the block. A PIFP index unit identity may be used as PIFP information associated with PIFP encoded video instead of using the x and y coordinates of a point in the block. Referring to FIG. 2, given a block 200 of N×M pixels, there are $2 \times ((N-1)+(M-1))$ pixels along the peripheral block boundary. Hence, $2 \times ((N-1)+(M-1))$ unique PIFP index units may be used to describe the PIFP index unit locations in a PIFP indexed pathway along the boundary of block 200.

FIG. 3 illustrates an example of a PIFP indexed pathway along a block peripheral boundary, using pixels as the index units in the PIFP indexed pathway, for a block 300 having 8×8 pixels. As described previously above, the PIFP indexed pathway includes 28 index units having index unit identity numbers "0" through "27" along the peripheral boundary of block 300. The two points where PIFP partitioning line 302 traverses the block 300 boundary may be represented by two of the index units. For the example, in FIG. 3, the partitioning line 302 may be represented by the two index units having index unit identities: "8" and "22". When block 300 is encoded in a PIFP encoder, index unit identities "8" and "22" may be embedded as PIFP information in a compressed video bitstream and utilized at a PIFP decoder to determine how the PIFP partitioning line 302 splits block 300.

Given a block with a dimension of N×M pixels, then $\log_2(2 \times ((N-1)+(M-1)))$ overhead bits may be used for the indexed pathway. $2 \times \log_2(2 \times ((N-1)+(M-1)))$ overhead bits may be used for a PIFP partitioning line traversing the block. In the example of FIG. 3, the block size for the block 300 is 8×8 pixels, and hence, the PIFP partitioning line traversing the block may utilize $2 \times \log_2(2 \times ((8-1)+(8-1))) = 2 \times \log_2(28)$ overhead bits in order to be represented. This exemplary representation of a PIFP partitioning line traversing a block may be varied in terms of overhead bits used and accuracy. For example, quantization may be applied to reduce the number of bits used for indexing the block boundary pixels, but at an expense of less accuracy in the representation of an object boundary line. Quantization may be scalable. Finer quantization may be employed for smaller blocks while coarser quantization may be utilized for larger blocks.

Figure 4:
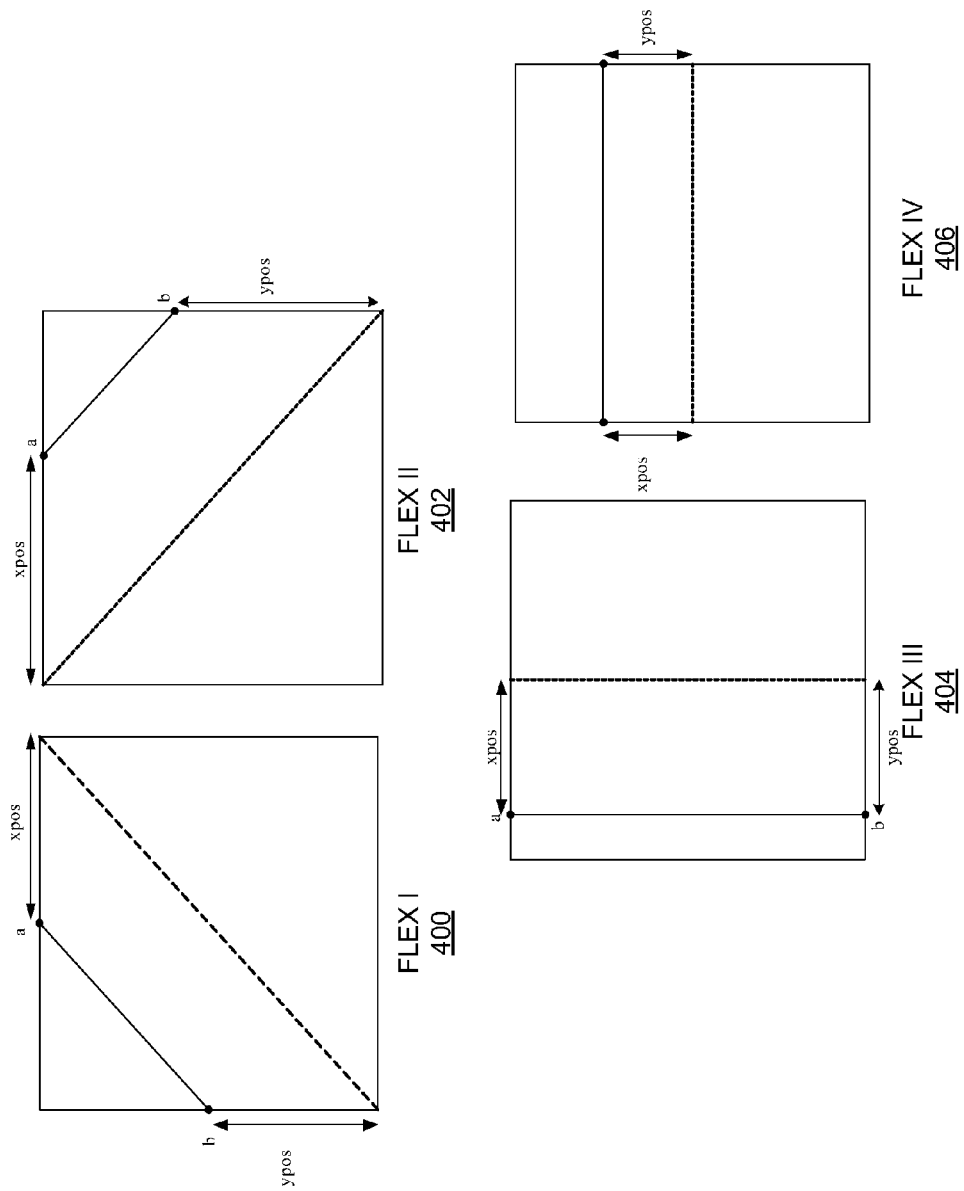
FIG. 4 is a schematic diagram illustrating FLEX partitioning as a comparison with the PIFP partitioning shown in FIG. 3, according to a comparative example of the present disclosure.
Figure 5:
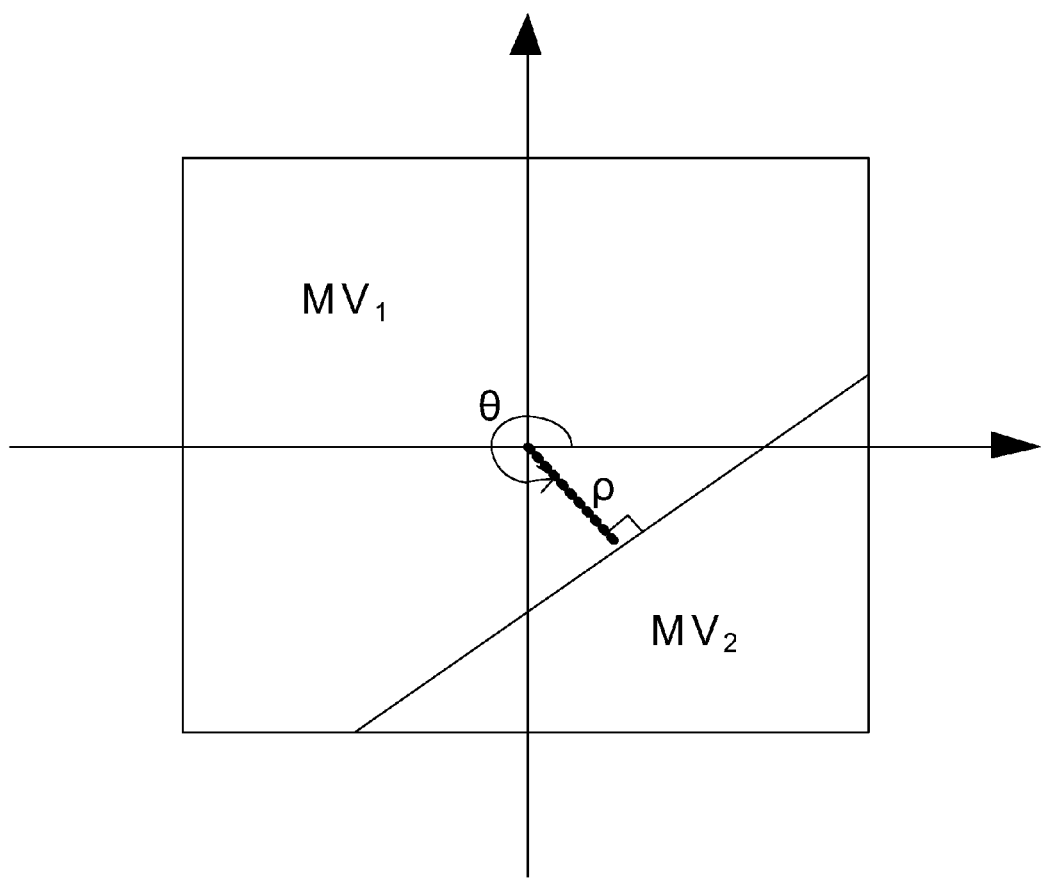
FIG. 5 is a schematic diagram illustrating GEO partitioning as a comparison with the PIFP partitioning shown in FIG. 3, according to a comparative example of the present disclosure.

Compared to FLEX and GEO, the PIFP methodology provides a more options and a better trade-off in terms of flexibility, overhead, and complexity. The PIFP methodology allows block partitioning with more flexibility with regard to partition shapes than FLEX. As shown in FIG. 4, FLEX is limited to only four directions as shown in FLEX I 400, FLEX II 402, FLEX III 404, FLEX IV 406. And the PIFP methodology is more efficient than the GEO 500 partitioning shown in FIG. 5. PIFP requires less computation than GEO since PIFP does not have to convert the slope and index unit identities into real pixel coordinates as done in GEO.

Figure 6:
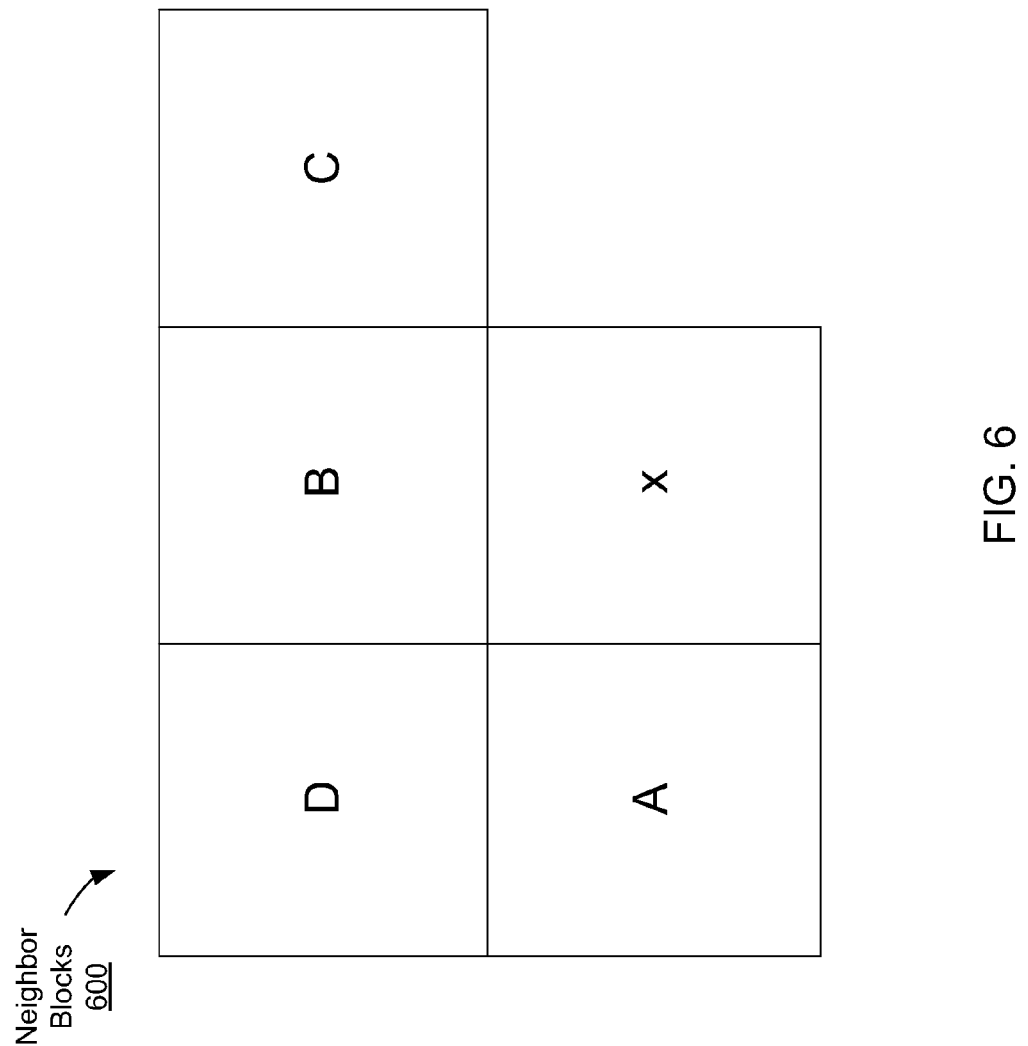
FIG. 6 is a schematic diagram illustrating a group of neighboring PIFP blocks in a video frame, according to an example of the present disclosure.

In addition, PIFP with a block periphery PIFP indexed pathway may be used in predictive coding. According to an example, a PIFP partitioning line may traverse a block periphery at two pixels. The respective index units for the two pixels may be predictive coded to achieve more efficient PIFP encoding. This may be accomplished because an object boundary line may continue across multiple blocks. Hence, the object boundary lines of the neighboring blocks may be used as predictors for the object boundary lines of a current block. If the blocks of a picture are coded in the raster scan order, that is, from left to right and top to bottom, a current block "x" may have four possible coded neighboring blocks 600 (A, B, C and D) as shown in FIG. 6. If a coded neighboring block has a PIFP partitioning line traversing the boundary of the current block "x", the PIFP partitioning line may be considered to extend into the current block "x" with the same slope, and its PIFP partitioning line extension may be used as a predictor of a PIFP partitioning line for the current block "x".

Figure 7:
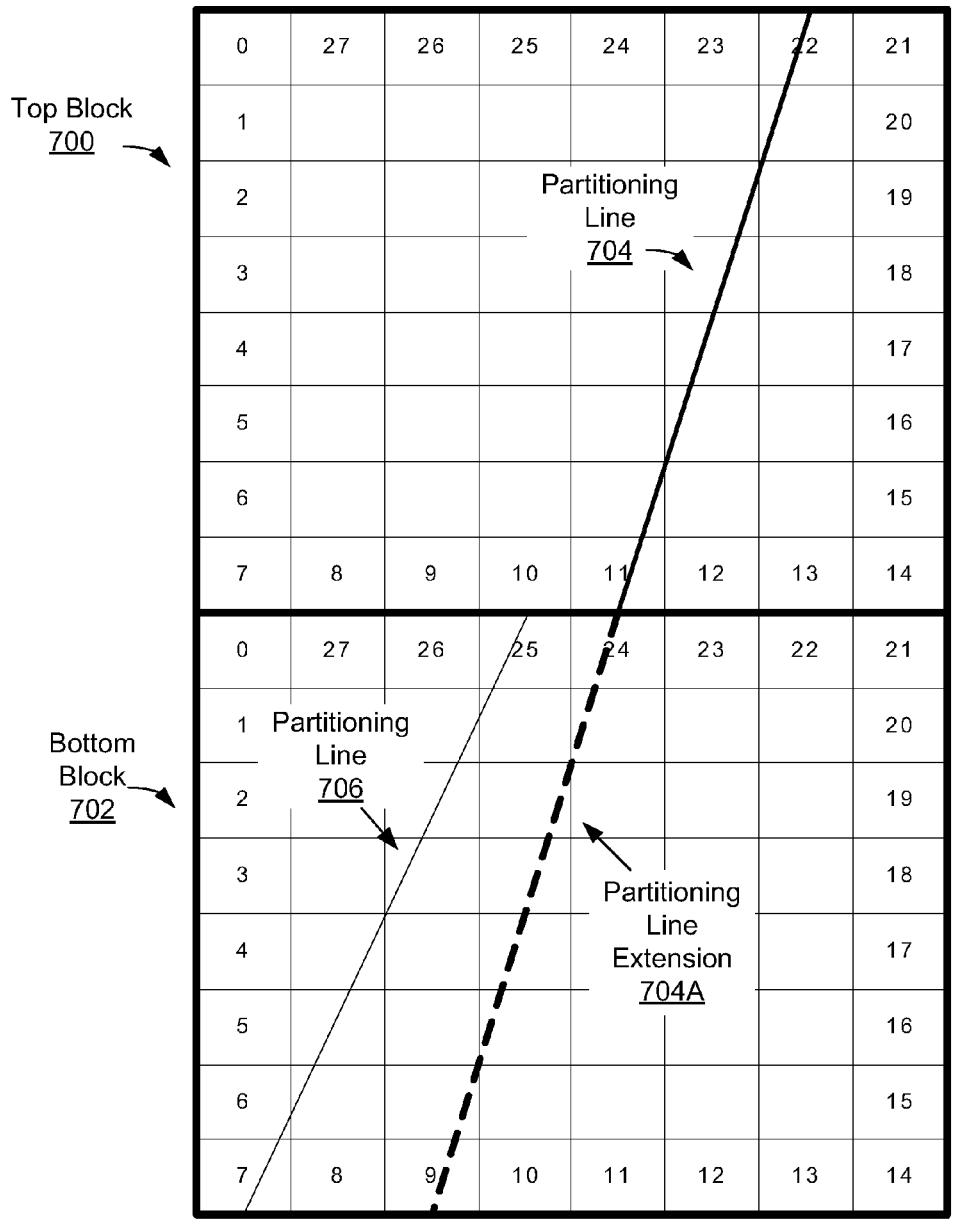
FIG. 7 is a schematic diagram illustrating top and bottom neighboring PIFP blocks in a video frame, according to an example of the present disclosure.

In an example of predictive coding in PIFP, referring to FIG. 7, there is a partitioning line 704 in top block 700 with the two index units having index unit identities: "11" and "22". Since the partitioning line extension 704A of partitioning line 704 also traverses the bottom block 702 boundary, the partitioning line extension 704A is considered to extend into the current block (bottom block 702) and traverses the current block 702 boundary at the pixels of index units having index unit identities "9" and "24", as shown in FIG. 7. In the circumstance that the partition 706 of the current block (bottom block 702) traverses the current block (bottom block 702) boundary at the pixels of index units "7" and "25", instead of coding index unit identities "7" and "25", in predictive coding with PIFP, the difference between the index unit identities of "7" and "9", and then "25" and "24" may instead be coded as PIFP information. Due to the spatial correlation associated with the index unit identities in the neighboring blocks, the PIFP coding of the index unit identity differences is more efficient than PIFP coding of the index unit identities directly. Accordingly, a PIFP partitioning line extension, such as partitioning line extension 704A, may be used as an efficient predictor to code an actual PIFP partitioning line for a current block.

An example is now demonstrated of predictive coding computations with a peripheral indexed pathway of pixels and with two pixels in the indexed pathway describing a PIFP partitioning line traversing a current block boundary. Given a current block with a PIFP partitioning line traversing the current block boundary at two pixels, $pel_1$ and $pel_2$, there may be one or more coded neighboring blocks. In the example shown in FIG. 6, neighbor blocks A, B, C and D are coded neighbor blocks. With reference to FIG. 7, coded neighbor block B in FIG. 6 corresponds with the top block 700 and current block "x" in FIG. 6, corresponds with bottom block 702.

Top block 700 has partitioning line 704 which traverses the current block 702 boundary. Partitioning line 704 may be extended into the current block 702 through partitioning line extension 704A having the same slope as partitioning line 704. Partitioning line extension 704A traverses the current block 702 through the periphery boundary at two pixels. These two pixels each have an assigned index unit in a current block coordinate system of the current block, such as shown in FIG. 7. The pixel with the smaller index unit identity of 9 in current block 702 may be defined as reference pixel 1, $refpel_1$, and the other pixel at index unit identity 24, as reference pixel 2, $refpel_2$.

The two reference pixels, $refpel_1$ and $refpel_2$, are used to predictively code partitioning line 706 in current block 702. Partitioning line 706 has two boundary pixels. The pixel at the index unit having index unit identity 7 is $pel_1$ and the pixel at the index unit having index unit identity 25 is $pel_2$. The index unit of $refpel_1$ may be used as a predictor to predictively code the index unit of one of the two pixels, $pel_1$ or $pel_2$, and then the index unit of $refpel_2$ may be used as a predictor to predictively code the index unit of the other pixel, $pel_2$ or $pel_1$. The difference in index unit identities may be either positive or negative depending on the relative location between $pel_1/pel_2$ and $refpel_1/refpel_2$. Also, an index associated with neighboring blocks may be used to identify the neighbor block from which a predictor line is generated in case there are more than one neighboring block with a partitioning line extension traversing the current block.

Figure 8:
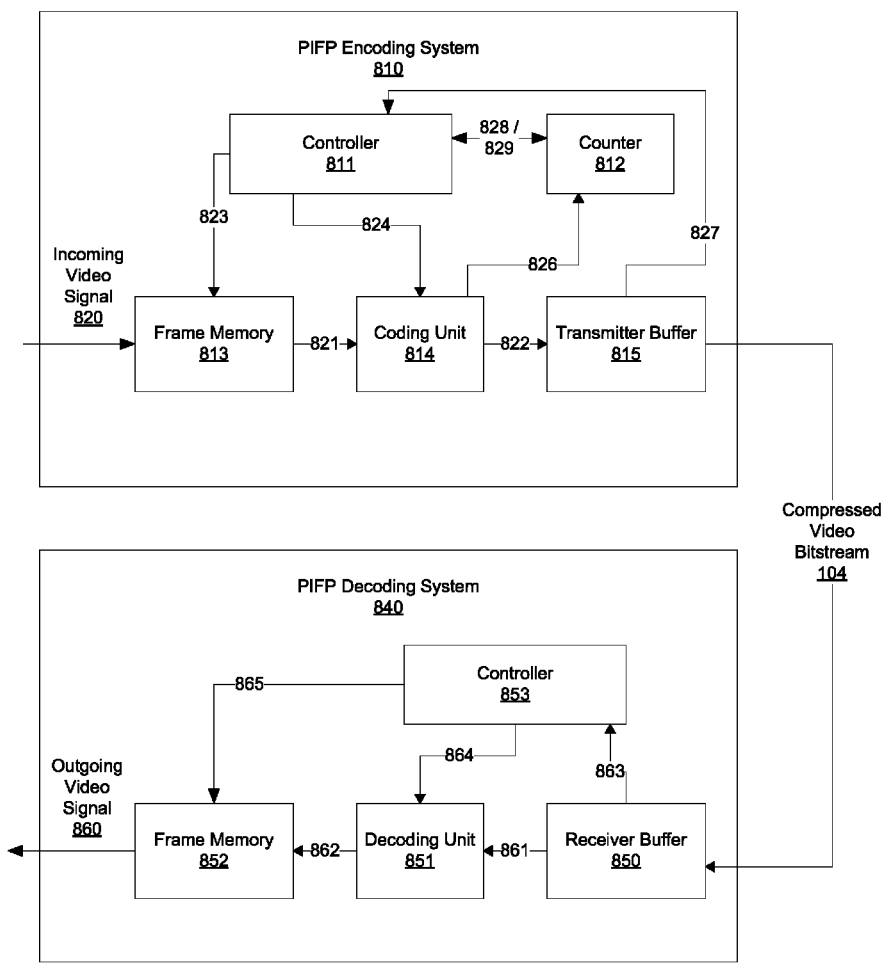
FIG. 8 is a block diagram illustrating PIFP encoding and decoding apparatuses operable to encode the video signal and decode the compressed video bitstream shown in FIG. 1, according to an example of the present disclosure.

Referring to FIG. 8, the PIFP encoding system 810 includes a controller 811, a counter 812, a frame memory 813, an encoding unit 814 and a transmitter buffer 815. The PIFP decoding system 840 includes a receiver buffer 850, a decoding unit 851, a frame memory 852 and a controller 853. The encoding system 810 and the decoding system 840 are coupled to each other via a transmission path including the compressed video bitstream 104. The controller 811 of the PIFP encoding system 810 controls the amount of data to be transmitted on the basis of the capacity of the receiver buffer 850 and may include other parameters such as the amount of data per a unit of time. The controller 811 controls the encoding unit 814, to prevent the occurrence of a failure of a received signal decoding operation of the PIFP decoding system 840. The controller 811 may include, for example, a microcomputer having a processor, a random access memory and a read-only memory.

An incoming signal 820 supplied from, for example, a content provider may include frames or pictures in a video sequence. PIFP information, such as index identities and any computational data, may be developed in performing PIFP encoding of the video in incoming signal 820, utilizing the controller 811. The frame memory 813 has a first area used for storing the incoming frames or pictures in the video from the incoming signal 820 and a second area is used for reading out the stored data and outputting it to the encoding unit 814. The controller 811 outputs an area switching control signal 823 to the frame memory 813. The area switching control signal 823 indicates whether the first area or the second area is to be used.

The controller 811 outputs an encoding control signal 824 to the encoding unit 814. The encoding control signal 824 causes the encoding unit 814 to start an encoding operation. In response to the encoding control signal 824 from the controller 811, including control information associated with the frames or pictures, the encoding unit 814 starts to read out the video signal to a high-efficiency encoding process, such as an interframe coding process or a discrete cosine transform to encode the frames or pictures and associated PIFP information generated by the controller 812 and to prepare these items for encoding.

The encoding unit 814 may prepare an encoded video signal 822 in a packetized elementary stream (PES) including video packets and program information packets. The encoding unit 814 may map the video access units into video packets using a program time stamp (PTS) and the control information. The PTS and the control information may also be associated with a program information packet which is associated with a corresponding video packet.

The encoded video signal 822 is stored with the encoded video and PIFP information in the transmitter buffer 815. The information amount counter 812 is incremented to indicate the amount of data in the transmitted buffer 815. As data is retrieved and removed from the buffer, the counter 812 is decremented to reflect the amount of data in the buffer. The occupied area information signal 826 is transmitted to the counter 812 to indicate whether data from the encoding unit 814 has been added or removed from the transmitted buffer 815 so the counter 812 can be incremented or decremented. The controller 811 controls the production of packets produced by the encoding unit 814 on the basis of the occupied area information 826 communicated in order to prevent an overflow or underflow from taking place in the transmitter buffer 815.

The information amount counter 812 is reset in response to a preset signal 828 generated and output by the controller 811. After the information counter 812 is reset, it counts data output by the encoding unit 814 and obtains the amount of information which has been generated. Then, the information amount counter 812 supplies the controller 811 with an information amount signal 829 representative of the obtained amount of information. The controller 811 controls the encoding unit 814 so that there is no overflow at the transmitter buffer 815.

The receiver buffer 850 of the decoding system 840 may temporarily store the encoded frames or pictures and PIFP information received from the PIFP encoding system 810 via the compressed video bitstream 104. The decoding system 840 counts the number of frames/pictures and received PIFP data, and outputs a frame number signal 863 which is applied to the controller 853. The controller 853 supervises the counted number of frames at a predetermined interval, for instance, each time the decoding unit 851 completes the decoding operation.

When the frame number signal 863 may indicate the receiver buffer 850 is at a predetermined capacity, the controller 853 may output a decoding start signal 864 to the decoding unit 851. When the frame number signal 863 may indicate the receiver buffer 850 is at less than a predetermined capacity, the controller 853 may wait for the occurrence of the situation in which the counted number of frames becomes equal to the predetermined amount. When the frame number signal 863 may indicate the receiver buffer 850 is at the predetermined capacity, the controller 853 outputs the decoding start signal 864. The encoded frames, caption information and frame disparity maps may be decoded in a monotonic order (i.e., increasing or decreasing) based on a presentation time stamp (PTS) in the header of the program information packets.

In response to the decoding start signal 864, the decoding unit 851 may decode data amounting to one frame/picture and associated PIFP information from the receiver buffer 850. Utilizing the PIFP information, the decoding unit 851 writes a decoded video signal 862 into the frame memory 852. The frame memory 852 has a first area into which the decoded video signal is written, and a second area used for reading out the decoded video data and outputting it to a monitor or the like.

According to different examples, the PIFP encoding system 810 may be incorporated or otherwise associated with the headend 102 shown in FIG. 1 and the PIFP decoding system 840 may be incorporated or otherwise associated with, for example, a set top box or an integrated receiving device, such as one of device A 106A, device B 106B and device C 106C.

Various manners in which the PIFP encoding system 810 and the PIFP decoding system 840 may be implemented are described in greater detail below with respect to FIGS. 9 and 10, which depict flow diagrams of methods 900 and 1000.

Figure 9:
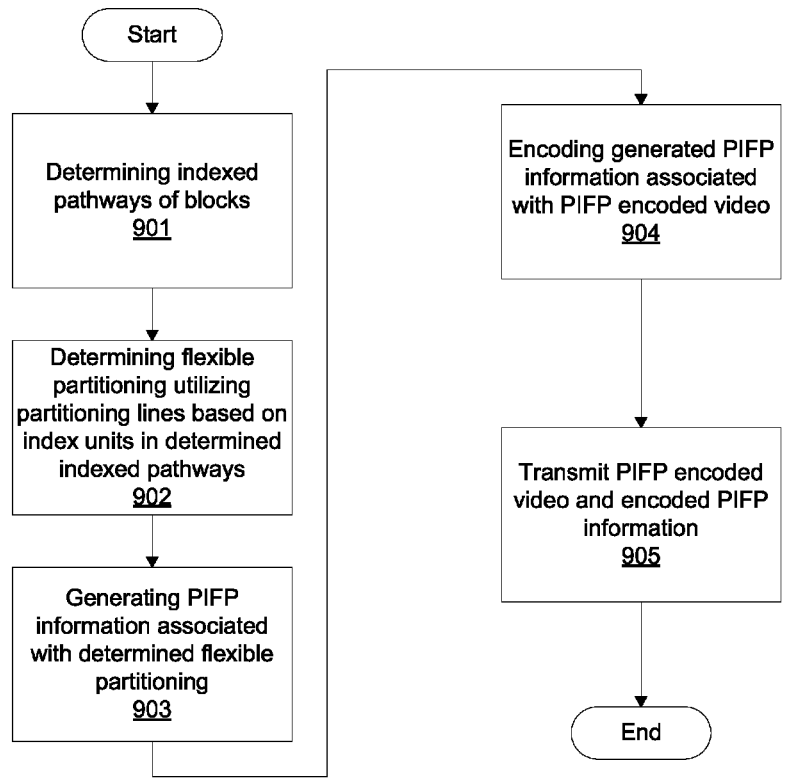
FIG. 9 is a flow diagram illustrating a PIFP encoding method operable to encode the video signal shown in FIG. 1, according to an example of the present disclosure.

With reference to the PIFP encoding method 900 in FIG. 9, at block 901, the PIFP encoding system 810 may determine an indexed pathway of blocks in the incoming video signal 820 utilizing the controller 811. The indexed pathway may include index units assigned with sequential index unit identities, spaced along the indexed pathway and at various granularities, such as a pixel granularity. The indexed pathway may be associated with a peripheral boundary of the blocks in the incoming video signal. The pathways may also be based on alternative criteria associated with the blocks.

At block 902, the PIFP encoding system 810 may utilize the controller 811 in determining flexible partitioning of the blocks utilizing partitioning lines based on index units in the determined index pathways. For greater PIFP coding efficiency, the flexible partitioning may be implemented to partition blocks along objects traversing the blocks at a location coinciding with the partitioning lines. At block 903, the PIFP encoding system 810 may utilize the coding unit 814 and the controller 811 in generating PIFP information associated with the determined flexible partitioning.

At block 904, the PIFP encoding system 810 may utilize the coding unit 814 in PIFP encoding the generated PIFP information associated with PIFP encoded video in a compressed video bitstream, such as compressed video bitstream 104.

At block 905, the PIFP encoding system 810 may utilize the transmitter buffer 815 in transmitting the PIFP encoded video including the generated PIFP information associated with the PIFP encoded video in the compressed video bitstream 104.

Figure 10:
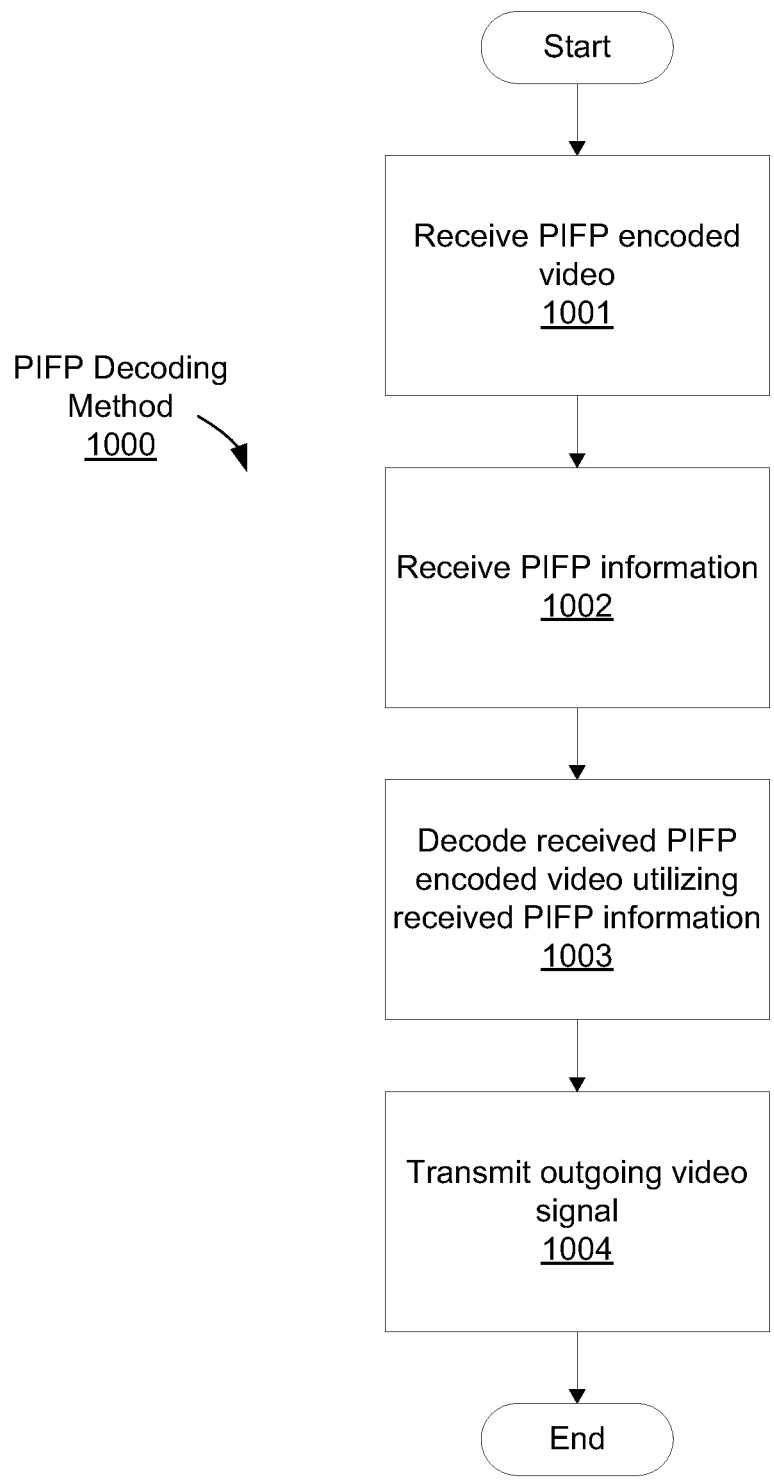
FIG. 10 is a flow diagram illustrating a PIFP decoding method operable to decode the compressed video bitstream shown in FIG. 1, according to an example of the present disclosure.

With reference to the PIFP decoding method 1000 in FIG. 10, at block 1001, the PIFP decoding system 840 may receive PIFP encoded video in the compressed video bitstream 104 at the receiver buffer 850. The PIFP encoded video may include video images compressed according to different standards.

At block 1002, the PIFP decoding system 840 may receive PIFP information associated with the PIFP encoded video in the compressed video bitstream 104 at the receiver buffer 850. The PIFP information may be packetized with the PIFP encoded video in the compressed video bitstream, such as the compressed video bitstream 104, or it may be received in a separate information stream.

At block 1003, the PIFP decoding system 840 may decode the received PIFP encoded video utilizing the received PIFP information to determine flexible partitioning in the PIFP encoded video to form the outgoing video signal 860.

At block 1004, the PIFP decoding system 840 may transmit the outgoing video signal 860 utilizing the frame memory 852.

Some or all of the operations set forth in the figures may be contained as a utility, program, or subprogram, in any desired computer readable storage medium. In addition, the operations may be embodied by computer programs, which can exist in a variety of forms both active and inactive. For example, they may exist as a machine readable instruction set (MRIS) program comprised of program instructions in source code, object code, executable code or other formats. Any of the above may be embodied on a computer readable storage medium, which include storage devices.

An example of a computer readable storage media includes a conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 11:
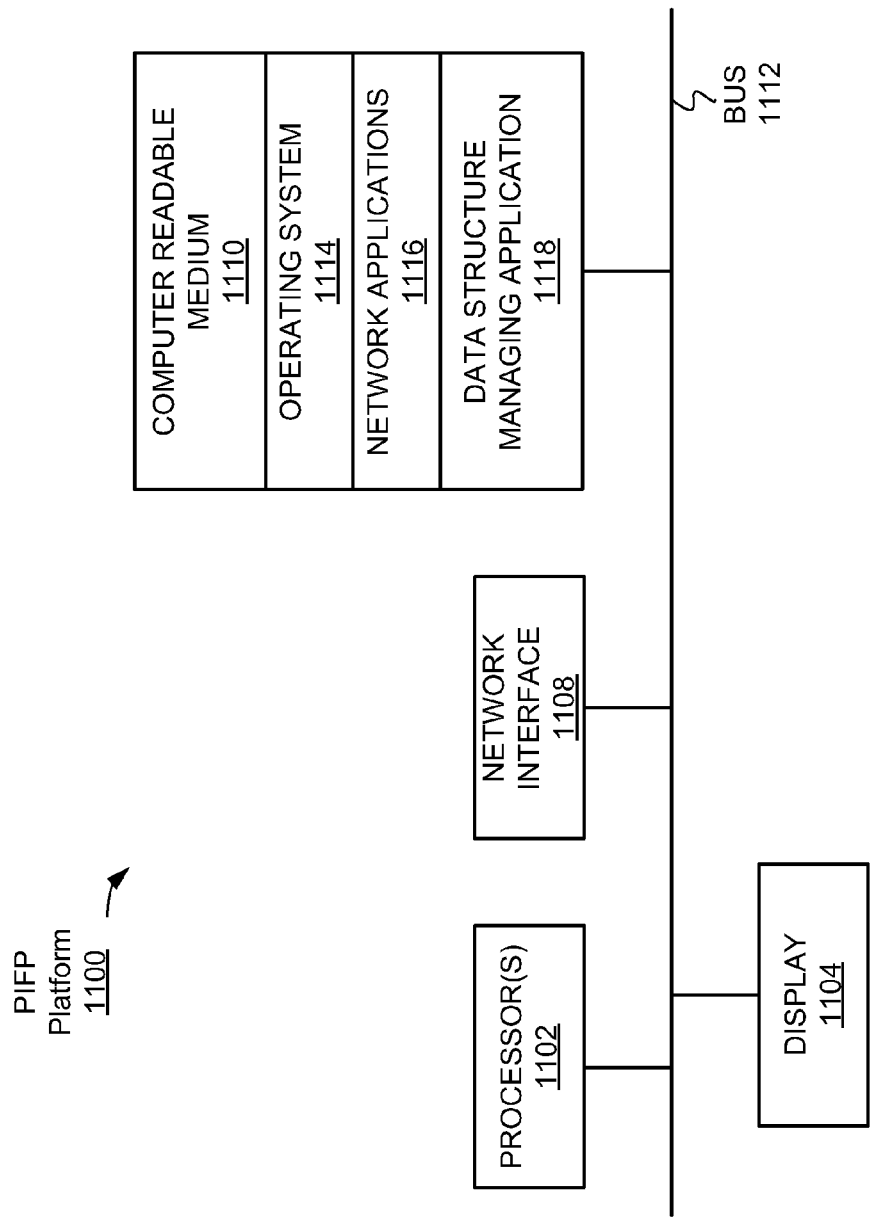
FIG. 11 is a block diagram illustrating a hardware and/or software platform operable to support the PIFP encoding and decoding apparatuses shown in FIG. 8, according to an example of the present disclosure.

Turning now to FIG. 11, there is shown a PIFP platform 1100, which may be employed as a platform in an encoding system, such as PIFP encoding system 810 and/or a decoding system, such as decoding system 840, for implementing or executing the methods depicted in FIGS. 9 and 10, or code associated with the methods. It is understood that the illustration of the PIFP platform 1100 is a generalized illustration and that the PIFP platform 1100 may include additional components and that some of the components described may be removed or modified without departing from a scope of the PIFP platform 1100.

The PIFP platform 1100 includes a processor 1102, such as a central processing unit; a display 1104, such as a monitor; a network interface 1108, such as a Local Area Network (LAN), a wireless 802.11x LAN, a 3G or 4G mobile WAN or a WiMax WAN; and a computer-readable medium 1110. Each of these components may be operatively coupled to a bus 1112. For example, the bus 1112 may be an EISA, a PCI, a USB, a FireWire, a NuBus, or a PDS.

The computer readable medium 1110 may be any suitable medium that participates in providing instructions to the processor 1102 for execution. For example, the computer readable medium 1110 may be non-volatile media, such as an optical or a magnetic disk; volatile media, such as memory; and transmission media, such as coaxial cables, copper wire, and fiber optics. Transmission media can also take the form of acoustic, light, or radio frequency waves. The computer readable medium 1110 may also store other MRIS applications.

The computer-readable medium 1110 may also store an operating system 1114, such as MAC OS, MS WINDOWS, UNIX, or LINUX; network applications 1116; and a data structure managing application 1118. The operating system 1114 may be multi-user, multiprocessing, multitasking, multithreading, real-time and the like. The operating system 1114 may also perform basic tasks such as recognizing input from input devices, such as a keyboard or a keypad; sending output to the display 1104 and keeping track of files and directories on medium 1110; controlling peripheral devices, such as disk drives, printers, image capture device; and managing traffic on the bus 1112. The network applications 1116 includes various components for establishing and maintaining network connections, such as MRIS for implementing communication protocols including TCP/IP, HTTP, Ethernet, USB, and FireWire.

The data structure managing application 1118 provides various MRIS components for building/updating a computer readable system (CRS) architecture, for a non-volatile memory, as described above. In certain examples, some or all of the processes performed by the data structure managing application 1118 may be integrated into the operating system 1114. In certain examples, the processes may be at least partially implemented in digital electronic circuitry, in computer hardware, firmware, MRIS, or in any combination thereof.

The examples of the PIFP methodology presents advantages over and solutions for drawbacks associated with FLEX and GEO flexible partitioning, and which may be applied in the HEVC standard. PIFP provides high flexibility, without the limitations on partition shape variability required by FLEX, and without the tradeoff in bitrate overhead required by GEO. The PIFP also provides predictive coding features to describe the flexible partitioning of neighboring blocks as well as providing a reduction in bitrate overhead based on relationships between neighboring blocks. PIFP provides these advantages in addition to addressing drawbacks and shortcomings associated with FLEX and GEO.

Although described specifically throughout the entirety of the disclosure, representative examples have utility over a wide range of applications, and the above discussion is not intended and should not be construed to be limiting. The terms, descriptions and figures used herein are set forth by way of illustration only and are not meant as limitations. While the examples have been described with reference to examples, those skilled in the art are able to make various modifications to the described examples without departing from the scope of the examples as described in the following claims, and their equivalents.

What is claimed is:

1. A method comprising:
   receiving a current block from a current frame from an input video signal;
   determining an indexed pathway for the current block, such that the indexed pathway includes a plurality of sequentially numbered index units along borders of the current block;
   determining a partitioning line for the current block, such that the partition line intersects a first index unit from the indexed pathway and a second index unit from the indexed pathway;
   including, in an output bitstream, an indication of a first index value identifying the first index unit;
   including, in the output bitstream, an indication of a second index value identifying the second index unit;
   identifying a first portion of the current block based on the partitioning line;
   identifying a second portion of the current block based on the partitioning line;
   generating a first encoded portion by encoding the first portion of the current block;
   generating a second encoded portion by encoding the second portion of the current block;
   including the first encoded portion in the output bitstream;
   including the second encoded portion in the output bitstream; and
   transmitting or storing the output bitstream.

2. The method of claim 1, wherein the index units are associated with pixels.

3. The method of claim 1, wherein the first index unit is one of a plurality of index units along a first boundary of the current block.

4. The method of claim 3, wherein the second index unit is one of a plurality of index units along a second boundary of the current block, wherein the second boundary is opposite the first boundary.

5. The method of claim 1, wherein including the indication of the second index value includes:
   identifying a first point along the partitioning line, the first point corresponding to the first index unit;
   identifying a second point along the partitioning line, the second point corresponding to the second index unit;
   identifying a third point along the partitioning line, wherein the third point differs from the first point and the second point;
   identifying a fourth point along the partitioning line, wherein the fourth point differs from the first point, the second point, and the third point; and
   including an identification of the fourth point in the output bitstream.

6. An apparatus comprising:
   a memory; and a processor configured to execute instructions stored in the memory to:
- receive a current block from a current frame from an input video signal;
- determine an indexed pathway for the current block, such that the indexed pathway includes a plurality of sequentially numbered index units;
- determine a partitioning line for the current block, such that the partition line intersects a first index unit from the indexed pathway and a second index unit from the indexed pathway;
- include, in an output bitstream, an indication of a first index value identifying the first index unit;
- include, in the output bitstream, an indication of a second index value identifying the second index unit;
- identify a first portion of the current block based on the partitioning line;
- identify a second portion of the current block based on the partitioning line;
- generate a first encoded portion by encoding the first portion of the current block;
- generate a second encoded portion by encoding the second portion of the current block;
- include the first encoded portion in the output bitstream;
- include the second encoded portion in the output bitstream; and
- transmit or store the output bitstream.

7. The apparatus of claim 6, wherein the index units are associated with pixels.

8. The apparatus of claim 6, wherein the first index unit is one of a plurality of index units along a first boundary of the current block.

9. The apparatus of claim 8, wherein the second index unit is one of a plurality of index units along a second boundary of the current block, wherein the second boundary is opposite the first boundary.

10. The apparatus of claim 6, wherein the processor is configured to execute instructions stored in the memory to include the indication of the second index value by:
- identifying a first point along the partitioning line, the first point corresponding to the first index unit;
- identifying a second point along the partitioning line, the second point corresponding to the second index unit;
- identifying a third point along the partitioning line, wherein the third point differs from the first point and the second point;
- identifying a fourth point along the partitioning line, wherein the fourth point differs from the first point, the second point, and the third point; and
- including an identification of the fourth point in the output bitstream.

11. The apparatus of claim 6, wherein the processor is configured to execute instructions stored in the memory to determine the indexed pathway along a border of a geometrical shape.

12. The apparatus of claim 6, wherein the processor is configured to execute instructions stored in the memory to determine the indexed pathway using a function describing the indexed pathway, wherein the pathway includes an arc or a non-right angle.

13. The apparatus of claim 6, wherein the processor is configured to execute instructions stored in the memory to include, in the output bitstream, the indication of the first index value identifying the first index unit by including predictive coding information associated with the index value.

14. The apparatus of claim 13, wherein the predictive coding information is based on an indexed pathway of a neighboring block.

* * * * *

UNITED STATES PATENT AND TRADEMARK OFFICE
CERTIFICATE OF CORRECTION

| | |
|---|---|
| PATENT NO. | : 9,020,043 B2 |
| APPLICATION NO. | : 13/101809 |
| DATED | : April 28, 2015 |
| INVENTOR(S) | : Krit Panusopone et al. |

It is certified that error appears in the above-identified patent and that said Letters Patent is hereby corrected as shown below:

On the title page, the name of Assignee should be —Google Technology Holdings LLC—

On the title page, page 2, under "Other Publications," column 2, line 4, date should be —Apr. 15-23, 2010—

Signed and Sealed this
Eighth Day of December, 2015

Michelle K. Lee
*Director of the United States Patent and Trademark Office*